United States Patent [19]

Orth, Jr.

[11] 4,285,832

[45] Aug. 25, 1981

[54] METHOD OF RECOVERING RESIDUAL VEGETABLE OIL CONTAINED IN SPENT BLEACHING CLAY AND PROCESSING THE BLEACHING CLAY FOR REUSE

[76] Inventor: George O. Orth, Jr., 10612 Riviera Pl. Northeast, Seattle, Wash. 98125

[21] Appl. No.: 176,990

[22] Filed: Aug. 11, 1980

[51] Int. Cl.³ .................. B01J 20/30; B01J 20/14; B01J 20/28; C11B 13/04
[52] U.S. Cl. ................... 252/424; 252/414; 252/446; 260/412.5; 260/428; 264/29.1; 264/29.3
[58] Field of Search .............. 252/414, 424, 446; 260/412.5, 428; 427/417; 264/29.1, 29.3, 29.5

[56] References Cited

U.S. PATENT DOCUMENTS

| | | | |
|---|---|---|---|
| 686,248 | 11/1901 | Barnes | 252/424 |
| 1,396,773 | 11/1921 | Mumford | 252/424 |
| 1,633,871 | 6/1927 | Prutzman | 252/414 |
| 2,509,509 | 5/1950 | Leaders et al. | 260/428 |
| 2,577,079 | 12/1951 | Gee | 260/412.5 |

FOREIGN PATENT DOCUMENTS 567573  2/1945  United Kingdom ............ 252/414

*Primary Examiner*—P. E. Konopka
*Attorney, Agent, or Firm*—Seed, Berry, Vernon & Baynham

[57] ABSTRACT

A method is disclosed for extracting residual vegetable oil contained in spent bleaching clays used in refining and processing of such oil and for processing the extracted clay for reuse. The spent bleaching clay containing the residual vegetable oil is mixed with water, an organic binder and a plastic clay to form a composition of putty-like consistency which can be formed into particulate solids of suitable size for solvent extraction of the oil. The vegetable oil in the particulate solids is then extracted by solvent extraction with a suitable solvent. The remaining particulate solids with the oil removed may be retorted to produce an activated carbon/clay product useful to lighten the color of the oil being processed, as a filter aid, for water treatment purposes or for other uses where activated carbon is generally used.

12 Claims, No Drawings

METHOD OF RECOVERING RESIDUAL VEGETABLE OIL CONTAINED IN SPENT BLEACHING CLAY AND PROCESSING THE BLEACHING CLAY FOR REUSE

BACKGROUND OF THE INVENTION

1. Field of the Invention

This invention relates to a method of extracting residual vegetable oil from spent bleaching clay used in processing of such oil and in processing of the spent bleaching clay with the oil removed for reuse in the form of an activated carbon/clay mixture.

2. Prior Art Related to the Disclosure

Unrefined vegetable oils, such as soybean oil, cottonseed oil, palm oil and coconut oil contain color bodies and impurities which, unless removed, render the oil commercially unsuitable. Such unrefined oils are generally refined by neutralizing them to reduce the fatty acid content thereof and then running them through a bleaching and filtering operation where the neutralized oil is heated to 100°-120° C. with a bleaching clay, such as Fuller's earth, a naturally porous aluminum silicate, for about 15 minutes, after which the oil is filtered. The clean oil recovered from the filtration operation may be further polished and processed. The spent clay left behind is, by nature, an absorbent and retains from 15-50 percent by weight of the vegetable oil. The amount of retained oil in the spent bleaching clay, generally discarded as waste material, is significant if it could be extracted in a convenient, practical and economical manner. In Malaysia, where palm and coconut oil are produced as a crop, processed and refined, there is an estimated 2 percent loss of oil due to its retention in the spent clay. 1980 estimates of the tonnage of palm oil to be exported from Malaysia are 2,568,000 tons. If all of this exported oil were bleached by use of such bleaching clays, about 51,360 tons of oil would remain in the bleached clay, an amount sufficient to justify extraction if an economical extraction process were available.

Pressing of the spent clay to remove the oil does not yield usable oil. Although it would be expected that solvent extraction of the oil from the spent clay would be practical, fine particles of the spent clay are carried along with the oil during solvent extraction and cannot be removed economically by filtration. If the spent clay containing the residual oil is compressed or pelletized to prevent carrying of the fine particles of the clay along with the oil during extraction, the solvent extraction process reduces the pellets to fine powder before extraction is complete, again making it both economically and practically infeasible to remove the clay particles in the oil by filtration.

SUMMARY OF THE INVENTION

It is a primary object of this invention to provide a method of extracting residual vegetable oil from spent bleaching clays used in refining of such vegetable oil by solvent extraction.

It is a further object of this invention to provide a method of economically and practically extracting residual vegetable oil from spent bleaching clay by mixing the spent clay containing the residual vegetable oil with a binder, a plastic clay and water and forming particulate pellets or flakes therefrom, the pellets or flakes holding the bleaching clay in a bonded state during solvent extraction so that the bleaching clay particles are not carried with the oil during solvent extraction.

It is a further object of this invention to provide a method of processing spent bleaching clay after removal of residual vegetable oil to produce an activated carbon/clay mixture suitable for use in decoloring the processed oil, in water treatment or in uses where activated carbon is used.

These and other objects are accomplished by mixing the spent clay containing the residual vegetable oil with an organic binder, water and a plastic clay to form a putty-like or granular composition, forming the composition into a plurality of particulate solids of suitable size for solvent extraction, and extracting the residual oil from the particulate solids with an extraction solvent, the particulate solids holding the spent bleaching clay in the bonded state and preventing the clay from being carried with the oil during the solvent extraction process.

DESCRIPTION OF THE PREFERRED EMBODIMENTS

The clay generally used in refining of vegetable oils, such as soya, cottonseed, palm and coconut oils, is generally Fuller's earth, a naturally occurring aluminum silicate which is absorbent and which, in addition to removing the color bodies and impurities in the unrefined oil, retains from 15-50 percent by weight of the oil processed therethrough. Since the spent clay cannot be pelletized and subjected to solvent extraction for removal of the residual vegetable oil without substantial attrition of the pellets and presence of the clay in the oil, the spent clay must be mixed with suitable binders which prevent attrition of the clay during solvent extraction and which do not inhibit extraction of the vegetable oils.

It has been found that by mixing the spent clay containing the residual vegetable oil with a sufficient amount of a plastic clay; that is, a clay which can be formed into a deformable shape when mixed with water, an organic binder and a sufficient amount of water to form a composition of putty-like or granular consistency which can be formed into pellets, flakes or otherwise shaped particulate solids, the vegetable oil can be extracted therefrom without attrition of the particulate solids containing the spent clay and without the spent clay particles being carried with the oil or extraction solvent. Instead, the clay particles are bound in the shaped composition. Generally, the putty-like or granular composition contains from 0.2-5 percent by weight organic binder, 5-20 percent by weight plastic clay, and 10-35 percent by weight water, with the spent filter clay making up 40-80 percent by weight of the composition. Fuller's earth, which is the most common of the filter clays used for processing of vegetable oils, is not a plastic clay.

The organic binders which can be used include water-soluble gums and resins, including starches, natural gums (guar, locust bean, xanthan, kayara, etc.), pectins, synthesized gums (alkyl-hydroxy celluloses, such as carboxymethylcellulose, carboxyethylcellulose, carboxypropylcellulose, hydroxymethylcellulose, hydroxyethylcellulose, and hydroxypropylcellulose), and alginates.

The plastic clays which are added to the composition are those having a fine particle size and which bond the spent filter clay together into a cohesive mass or shape which is not subject to attrition or decomposition when subjected to solvent extraction. Attapulgus clay is preferred, although spent clays from the tin mines of Malaysia may also be used, such clays generally containing about 40 percent by weight water when obtained directly from the mines.

After the spent clay containing the residual vegetable oil is mixed with water, organic binder and the additional plastic clay, it is formed into shaped solids, such as pellets, flakes or other shape of a suitable size for solvent extraction. The water remaining in the shaped solids is then removed (1) by heating of the solids, or (2) subjecting the shaped solids containing the water to countercurrent solvent extraction where the water is removed along with the residual vegetable oil as an azeotrope.

The solvents which may be used for extraction of the residual vegetable oil may be any suitable solvent. If the recovered oil is to be used for food processing purposes, aliphatic hydrocarbons, such as hexane or other hydrocarbons having from 6–12 carbon atoms, are generally employed. If not, chlorinated hydrocarbons, such as trichloroethylene, may be used. Aliphatic alcohols, such as n-propanol, iso-propanol or hexanol, may also be employed. The solvent extraction system used may be any of the conventional solvent extraction systems available.

After extraction of the residual vegetable oil from the particulate shaped solids, the dried shaped solids are subjected to retorting at temperatures ranging from 500° to 800° C. to convert the shaped solids into an activated carbon/clay mixture which can be used for similar purposes as activated carbon; i.e., to reduce the color in the refined oil, as a filter aid, for water treatment purposes, etc. An activated carbon/clay mixture can also be obtained by retorting the spent clay containing residual oil.

The following examples are illustrative of the method described and claimed here but are not intended to be limiting in any manner:

EXAMPLE I

Spent bleaching clay obtained from processing of vegetable oil and containing about 2.5 percent vegetable oil by weight was obtained from Jomalina SDN BHD refinery in Kuala Langat, Malaysia. A water-soluble starch obtained from Morningstar-Paisley having the tradename Starfilm 34 DPN, 10 grams, was mixed with 100 grams water in a Hobart mixer until a lump-free mixture was obtained. 50 grams of attapulgus clay (AT-50 from International Minerals Company) was added and mixed well. 242 grams of the spent bleaching clay were added to the above mixture to form a putty-like mass which was passed through a conventional meat grinder and extruded as 3/16 inch pellets of random length. These pellets were dried at 105° C. in an oven and the vegetable oil present in the spent bleaching clay was then extracted therefrom with trichloroethylene in a solvent extraction apparatus. When the pellets were removed from the extraction apparatus, they were found to be firm enough to pour without fragmentation and also sufficiently firm to handle without serious disintegration. The amount of oil recovered from the pellets amounted to 24.6 percent by weight based on the weight of the spent bleaching clay.

EXAMPLE II

Residual clay from tin mining operations of Malaysia, 500 grams, containing about 41 percent by weight water, was mixed with 200 grams of additional water. Cornstarch, 10 grams, was mixed with 17.3 grams of the above clay mixture, along with 500 grams of spent bleaching clay. The mixture was blended in a Hobart mixer and then passed through a meat grinder with a 3/16 inch opening and pelletized. The pellets were dried at 105° C. to constant weight and extracted with hexane solvent in a solvent extraction apparatus. A light oil, 18 percent by weight based on the weight of the spent bleached clay, was obtained.

EXAMPLE III

Spent clay pellets, 100 grams, prepared as in Example I, from which 18 percent of the vegetable oil had been recovered by extraction, were placed in a retort and heated in a furnace to 600° C. for ½ hour. Water, gas and oil fractions issuing from the sample were collected. The retort was cooled and the residue weighed and burned to whiteness to determine the carbon content. The residue and water, gas and oil fractions had the following analysis:

|  | Percent by Weight |
|---|---|
| Residue: | |
| carbon | 12 |
| clay | 67 |
| Water, Gas & Oil Fraction: | |
| oil, as fatty acids | 4.66 |
| water and acrolein | 8.24 |
| high molecular weight fatty acids, such as stearic acid | 1.0 |
| gases | 7.1 |
|  | 100.00 |

EXAMPLE IV

The clay/carbon mixture obtained from the retorting of the sample in Example III was tested for activated clay/carbon characteristics with methylene blue. A 1.8 percent solution of methylene blue in water was prepared and a reference curve obtained by use of a Spectronic 20 spectrophotometer, as follows:

| Dilution, cc | Percent Transmission |
|---|---|
| 1 | 78 |
| 5 | 26 |
| 10 | 13 |
| 20 | 3 |

One hundred cc's of the 1.8 percent solution of methylene blue was mixed for 10 minutes at 20° C. with various quantities of the activated carbon/clay mixture of Example IV to check its efficiency as a filter aid and impurity remover. The results were as follows:

| Grams Clay/Carbon | Percent Carbon | Percent Transmission |
|---|---|---|
| 0 | 0.00 | 0 |
| 1 | 0.12 | 4 |
| 2 | 0.24 | 78 |
| 3 | 0.36 | 96 |
| 4 | 0.48 | 100 |
| 5 | 0.60 | 100 |
| 10 | 1.2 | 100 |

From the above, it is obvious that a valuable activated material is obtained from the spent bleaching clay which can be used in water purification, to reduce color impurities in unrefined oils, etc.

EXAMPLE V

The pelletized clay from Example II, after extraction of the oil therefrom, was crushed to 60 mesh minus and retorted as described in Example III. They were then tested for their efficiency as a filter aid as in Example IV. The results were as follows:

| Grams Clay/Carbon | Percent Carbon | Percent Transmission |
|---|---|---|
| 1 | 0.006 | 0 |
| 2 | 0.192 | 16 |
| 3 | 0.28 | 66 |
| 4 | 0.38 | 98 |
| 5 | 0.48 | 100 |
| 10 | 0.96 | 100 |

EXAMPLE VI

Residual clay from tin mining operations of Malaysia, 500 grams, containing about 41 percent water, was mixed with 200 grams of a 1 percent solution of carboxymethylcellulose (Hercules). 500 grams spent filter clay were added and mixed in a Hobart mixer to form a wet, granular mixture. This was passed through a meat grinder with a 3/16 inch opening to form pellets. The wet pellets were dried at 105° C. in an oven and the oil extracted with hexane in a Soxhlet extraction apparatus. The oil recovered with hexane as a solvent was 22 percent. The oil color was very light in comparison to Example I, using trichloroethylene.

I claim:

1. A method of recovering residual vegetable oils contained in spent bleaching clay used in refining such vegetable oils, comprising:
    mixing the spent clay containing the residual oil with an organic binder, water, and a plastic clay,
    forming the composition into a plurality of shaped particulate solids of suitable size for solvent extraction of the vegetable oil therefrom,
    extracting the residual oil from the particulate solids with an extraction solvent for the vegetable oil, the shaped particulate solids retaining the spent bleaching clay in the bonded state and preventing the spent bleaching clay particles from being carried into the extraction solvent and oil.

2. The method of claim 1 wherein the spent clay contains 15–50 percent by weight residual vegetable oil and the organic binder is one selected from the group consisting of water-soluble gums and resins.

3. The method of claim 1 wherein the binder is present in an amount ranging from 0.2–5 percent by weight, the plastic clay is present in an amount ranging from about 5–20 percent by weight, water is present in an amount ranging from 10–35 percent by weight, and the spent bleaching clay present in amounts ranging from 40–80 percent by weight.

4. The method of claim 1, including heating the shaped particulate solids before extraction of the vegetable oil therefrom to remove the water therefrom.

5. The method of claim 1 wherein the shaped particulate solids are subjected to countercurrent extraction with an extraction solvent to remove the water in the shaped particulate solids as an azeotrope with the residual oil.

6. The method of claim 1 wherein the extraction solvent is a non-polar solvent.

7. The method of claim 6 wherein the non-polar solvent is one selected from the group consisting of aliphatic hydrocarbons containing from 6–12 hydrocarbons.

8. The method of claim 7 wherein the extraction solvent is hexane.

9. The method of claim 1, including heating the shaped particulate solids, after extraction, to a temperature sufficient to char the carbon content thereof, resulting in an activated carbon/clay composition.

10. The method of claim 2 wherein the clay is attapulgus clay and the binder is starch.

11. A method of recovering residual vegetable oil contained in spent bleaching clay used in the refining of such oil, comprising:
    mixing the spent bleaching clay containing the vegetable oil with 0.2–5 percent by weight of an organic binder selected from the group consisting of water-soluble gums and resins, 10–35 percent by weight water, and 5–20 percent of a plastic clay,
    forming the composition into a plurality of shaped particulate solids of suitable size for solvent extraction,
    removing substantially all of the water therefrom, and
    extracting the residual oil from the shaped particulate solids with an extraction solvent, the shaped particulate solids holding the spent bleaching clay therein in the bonded state and preventing the solids from being carried into the oil being extracted.

12. The method of claim 11, including heating the shaped particulate solids remaining after extraction to a temperature sufficient to char the carbon contained therein, resulting in an activated carbon/clay composition.

* * * * *